US007706550B2

(12) United States Patent
Amada et al.

(10) Patent No.: US 7,706,550 B2
(45) Date of Patent: Apr. 27, 2010

(54) NOISE SUPPRESSION APPARATUS AND METHOD

(75) Inventors: Tadashi Amada, Kanagawa-ken (JP); Akinori Kawamura, Tokyo (JP); Ryosuke Koshiba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1492 days.

(21) Appl. No.: 11/028,317

(22) Filed: Jan. 4, 2005

(65) Prior Publication Data

US 2005/0152563 A1 Jul. 14, 2005

(30) Foreign Application Priority Data

Jan. 8, 2004 (JP) ............................ 2004-003108

(51) Int. Cl.
*H04B 15/00* (2006.01)

(52) U.S. Cl. ..................... 381/94.1; 381/94.5; 381/94.7

(58) Field of Classification Search ..... 381/71.1-71.14, 381/94.1-94.9; 379/406.01-406.16; 704/226, 704/233
See application file for complete search history.

(56) References Cited

U.S. PATENT DOCUMENTS

| | | | | |
|---|---|---|---|---|
| 6,230,123 | B1 * | 5/2001 | Mekuria et al. | 704/226 |
| 6,522,753 | B1 * | 2/2003 | Matsuzawa et al. | 381/71.1 |
| 7,203,326 | B2 * | 4/2007 | Matsuzawa et al. | 381/94.2 |

FOREIGN PATENT DOCUMENTS

| | | |
|---|---|---|
| JP | 8-022297 | 1/1996 |
| JP | 8-167879 | 6/1996 |
| JP | 8-221092 | 8/1996 |
| JP | WO99/50825 | 10/1999 |
| JP | 2000-010593 | 1/2000 |
| JP | 2000-347688 | 12/2000 |
| JP | 2003-195882 | 7/2003 |
| JP | 3454402 | 7/2003 |
| JP | 3454403 | 7/2003 |
| JP | 3459363 | 8/2003 |

OTHER PUBLICATIONS

Steven F. Boll, "Suppression of Acoustic Noise in Speech Using Spectral Subtraction", IEEE Transactions on Acoustics, Speech, and Signal Processing, vol. ASSP-27, No. 2, Apr. 1979, pp. 113-120.
Zenton Goh, et al., "Postprocessing Method for Suppressing Musical Noise Generated by Spectral Subtraction", IEEE Transactions on Speech and Audio Processing, vol. 6, No. 3, May 1998, pp. 287-292.

* cited by examiner

*Primary Examiner*—Vivian Chin
*Assistant Examiner*—Fatimat O Olaniran
(74) *Attorney, Agent, or Firm*—Oblon, Spivak, McClelland, Maier & Neustadt, L.L.P.

(57) ABSTRACT

A noise estimation unit estimates a noise signal in an input signal. A section decision unit distinguishes a target signal section from a noise signal section in the input signal. A noise suppression unit suppresses the noise signal based on a first suppression coefficient from the input signal. A noise excess suppression unit suppresses the noise signal based on a second suppression coefficient from the input signal. The second suppression coefficient is larger than the first suppression coefficient. A switching unit switches between an output signal from the noise suppression unit and an output signal from the noise excess suppression unit based on a decision result of the section decision unit.

20 Claims, 11 Drawing Sheets

NOISE SUPPRESSION APPARATUS AND METHOD

CROSS-REFERENCE TO RELATED APPLICATIONS

This application is based upon and claims the benefit of priority from prior Japanese Patent Application P2004-003108, filed on Jan. 8, 2004; the entire contents of which are incorporated herein by reference.

FIELD OF THE INVENTION

The present invention relates to a noise suppression apparatus and method for extracting a voice signal from input acoustic signal.

BACKGROUND OF THE INVENTION

In proportion to practical use of a speech recognition or a cellular phone in actual environment, a signal processing method for excluding a noise from an acoustic signal on which the noise is superimposed in order to emphasize a voice signal becomes important. Especially, Spectral Subtraction (SS) method is often used because it is effectively easy to be realized. The Spectral Subtraction method is disclosed in "S. Boll, "Suppression of Acoustic Noise in Speech Using Spectral Subtraction", IEEE Trans., ASSP-27, No. 2, pp. 113-120, 1979".

The Spectral Subtraction method includes a problem that it often causes a perceptually unnatural sound (called "a musical noise"). Musical noise is especially notable in a noise section. Because of statistical variance of the noise signal, removing an average value of noise signal from an input signal causes discontinuity in the remaining signal of the reduction. The musical noise is due to the remaining signal of reduction. In order to solve this problem, an excess suppression method is utilized. In the excess suppression method, by reducing a value larger than an estimation noise from the input signal, all variation elements of the noise are suppressed. In this case, if a reduction result becomes a negative value, the negative value is replaced by a minimum value. However, in the excess suppression method, suppression overflows in a voice section. As a result, a voice is distorted in the voice section. For example, the excess suppression method is disclosed in "Z. Goh, K. Tan and B. T. G. Tan, "Postprocessing Method for Suppressing Musical Noise Generated by Spectral Subtraction", IEEE Trans., SAP-6, No. 3, May 1998".

Furthermore, a method for executing some processing on a section generating musical noise in order not to perceive the musical noise is utilized. For example, a small gain is multiplied with each input signal and the multiplication result is superimposed to the output signal. However, in this method, if a sufficient signal is superimposed so as not to perceive the musical noise, a noise level raises by the superimposed signal. As a result, effect of noise suppression is lost.

As mentioned-above, excess suppression using a large suppression coefficient reduces musical noise. However, distortion often occurs in the voice section. Furthermore, in the post processing method for superimposing the input signal on the musical noise, by superimposing the sufficient signal so as not to perceive the musical noise, effect of noise suppression is lost.

SUMMARY OF THE INVENTION

The present invention is directed to a noise suppression apparatus and method able to suppress a musical noise in a noise section without a distortion in a voice section.

According to an aspect of the present invention, there is provided a noise suppression apparatus, comprising: a noise estimation unit configured to estimate a noise signal in an input signal; a section decision unit configured to decide a target signal section and a noise signal section in the input signal; a noise suppression unit configured to suppress the noise signal based on a first suppression coefficient from the input signal; a noise excess suppression unit configured to suppress the noise signal based on a second suppression coefficient from the input signal, the second suppression coefficient being larger than the first suppression coefficient; and a switching unit configured to switch between an output signal from said noise suppression unit and an output signal from said noise excess suppression unit based on a decision result of said section decision unit.

According to another aspect of the present invention, there is also provided a noise suppression method, comprising: estimating a noise signal in an input signal; deciding a target signal section and a noise signal section in the input signal; suppressing the noise signal based on a first suppression coefficient from the input signal to obtain a first output signal; suppressing the noise signal based on a second suppression coefficient from the input signal to obtain a second output signal, the second suppression coefficient being larger than the first suppression coefficient; and switching between the first output signal and the second output signal based on a decision result.

According to still another aspect of the present invention, there is also provided a computer program product, comprising: a computer readable program code embodied in said product for causing a computer to suppress a noise, said computer readable program code comprising: a first program code to estimate a noise signal in an input signal; a second program code to decide a target signal section and a noise signal section in the input signal; a third program code to suppress the noise signal based on a first suppression coefficient from the input signal to obtain a first output signal; a fourth program code to suppress the noise signal based on a second suppression coefficient from the input signal to obtain a second output signal, the second suppression coefficient being larger than the first suppression coefficient; and a fifth program code to switch between the first output signal and the second output signal based on a decision result.

DETAILED DESCRIPTION OF THE EMBODIMENTS

Figure 1:
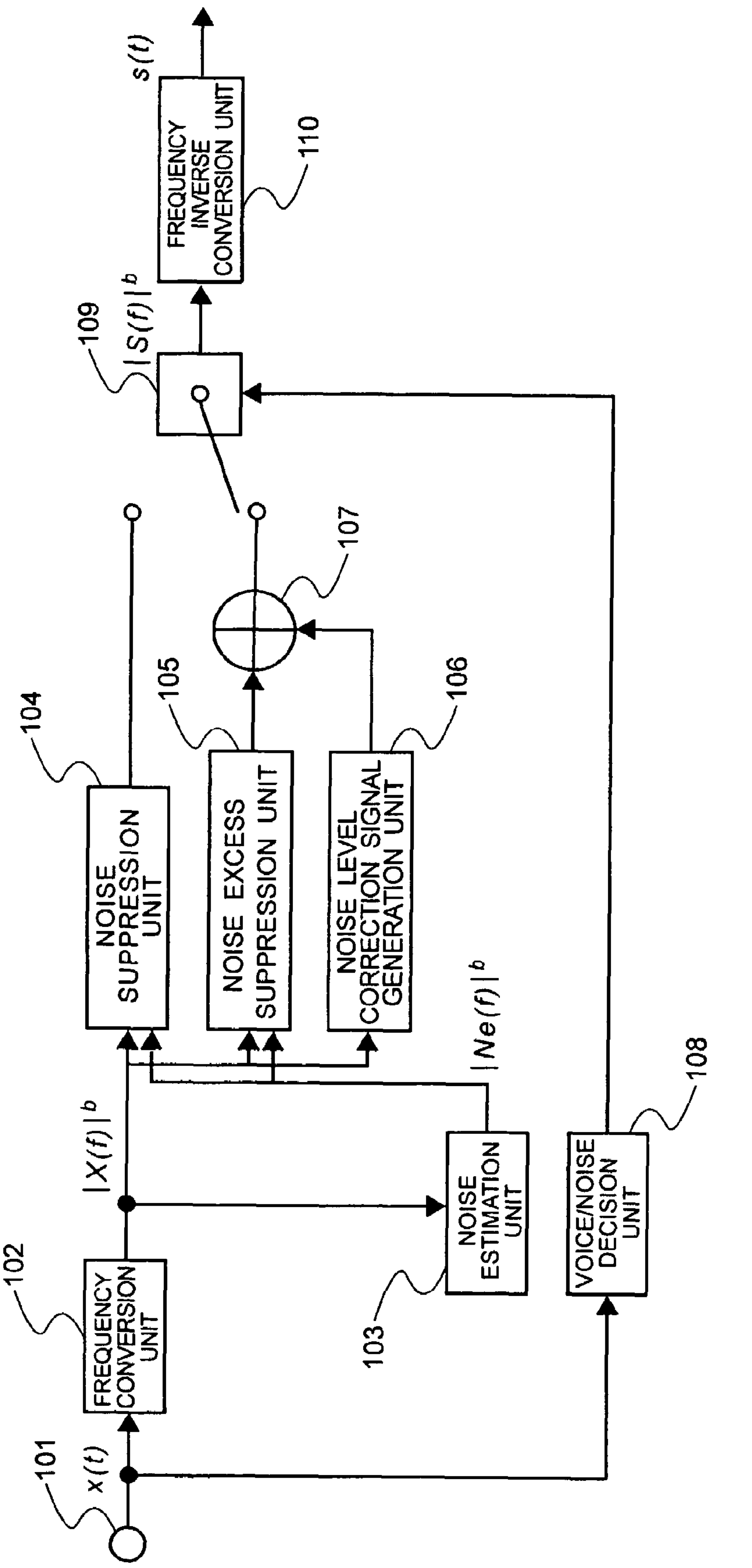
FIG. 1 is a block diagram of a noise suppression apparatus according to a first embodiment of the present invention.

Hereinafter, various embodiments of the present invention will be explained by referring to the drawings.

FIG. 1 is a block diagram of a noise suppression apparatus according to a first embodiment of the present invention. As shown in FIG. 1, the noise suppression apparatus includes the following units. An input terminal 101 inputs an acoustic signal. A frequency conversion unit 102 converts the acoustic signal to a frequency domain. A noise estimation unit 103 estimates a noise signal from an output of the frequency conversion unit 102. A noise suppression unit 104 generates a signal in which noise is suppressed from output signals of the frequency conversion unit 102 and the noise estimation unit 103. A noise excess suppression unit 105 generates a signal in which noise is more suppressed from output signals of the frequency conversion unit 102 and the noise estimation unit 103. A noise level correction signal generation unit 106 generates a signal to correct a noise level from the output signal of the frequency conversion unit 102. An adder 107 adds an output signal of the noise excess suppression unit 105 to an output signal of the noise level correction signal generation unit 106. A voice/noise decision unit 108 decides (determines or distinguishes) a voice section and a noise section from the input signal. A switching unit 109 selectively switches an output signal of the noise suppression unit 104 and an output signal of the adder 107 based on a decision result of the voice/noise decision unit 108. A frequency inverse conversion unit 110 converts an output signal of the switching unit 109 to a time domain.

First, the input terminal 101 inputs a following signal.

$$x(t)=s(t)+n(t) \quad (1)$$

In this equation, "x(t)" is a signal of time waveform received by an input device such as a microphone, "s(t)" is a target signal element (For example, a voice) in x(t), and "n(t)" is non-target signal element (For example, a surrounding noise) in x(t). The frequency conversion unit 102 converts x(t) to a frequency domain by a predetermined window length (For example, using DFT) and generates "X(f)" (f: frequency).

The noise estimation unit 103 estimates a noise signal "Ne(f)" from X(f). For example, in the case that s(t) is a voice signal, the estimation value Ne(f) includes non-utterance section. In the non-utterance section, "x(t)=n(t)" and assume that an average value of this section is Ne(f). The estimation value "|Se(f)|" is calculated as follows.

$$|Se(f)|=|X(f)|-\mathbf{60}\ |Ne(f) \quad (2)$$

By returning |Se(f)| to a time domain, only voice can be estimated. |Se(f)| is an amplitude value without a phase term. In general, |Se(f)| is represented using a phase term of input signal X(f). Above equation (2) represents a method by an amplitude spectral. Furthermore, the equation (2) can be represented by a power spectral as follows.

$$|Se(f)|^b=|X(f)|^b-\alpha|Ne(f)|^b \quad (3)$$

By regarding a spectral subtraction as filter operation, the equation (2) can be represented as follows.

$$Se(f)=\left(\frac{(|X(f)|^b-\alpha|Ne(f)|^b)}{|X(f)|^b}\right)^{\left(\frac{1}{a}\right)}X(f) \quad (4)$$

In the case of "(a, b)=(1, 1)", above equation (4) is equivalent to the equation (2) of spectral subtraction using amplitude spectral. In the case of "(a, b)=(2, 2)", the equation (4) represents spectral subtraction using power spectral. Furthermore, in the case of "(a, b)=(1, 2)" and "α=1", the equation (4) represents a form of Wiener filter. These are regarded as the same method uniformly describable on realization.

In general, X(f) are complex numbers and represented as follows.

$$X(f)=|X(f)|\exp(j\arg(X(f))) \quad (5)$$

"|X(f)|" is a magnitude of X(f), "arg(X(f))" is a phase, and "j" is an imaginary unit. The magnitude of X(f) is output from the frequency conversion unit 102. In this case, the magnitude is represented as a general expression using an index number "b". The reason is that several variations exist in spectral subtraction. A value of "b" is often "1" or "2". The noise estimation unit 103 calculates an estimation noise $|Ne(f)|^b$ from $|X(f)|^b$. In this case, an average value of a section regarded as the noise section from $|X(f)|^b$ is used.

For example, in the noise section, the estimation noise is calculated as follows.

$$|Ne(f,n)|^b=\delta|Ne(f,n-1)|^b+(1-\delta)|X(f)|^b \quad (6)$$

In the above equation, "$|Ne(f, n)|^b$" is a value of a present frame, "$|Ne(f, n-1)|^b$" is a value of a previous frame, and "δ" is a value as "(0<δ<1)" to control a degree of smoothing. As a method for deciding a voice section, a section of which magnitude of $|X(f)|^b$ is large is decided as the voice section. Furthermore, by calculating a ratio of $|X(f)|^b$ to $|Ne(f, n)|^b$, a section of which ratio of $|X(f)|^b$ is above some ratio may be decided as the voice section.

In the noise suppression unit 104 and the noise excess suppression unit 105, output |Ne(f)| of the noise estimation unit 103 is subtracted from output $|X(f)|^b$ of the frequency conversion unit 102, and the subtraction result $|Se(f)|^b$ is output. In this case, the equation (3) is used. However, in the case that the estimation noise |Ne(f)| is larger than the input signal |X(f)|, several processing methods may be used. For example, following equation can be used.

$$|Se(f)|^b=\mathrm{Max}(|X(f)|^b-\alpha|Ne(f)|^b,\ \beta|X(f)|^b) \quad (7)$$

In this equation, Max(x, y) represents a larger value of "x, y", and "α" represents a suppression coefficient, and "β" represents a flooring coefficient. The larger the value of α is, the larger the number of noises can be reduced. As a result, noise suppression effect becomes large. However, in the voice section, a distortion occurs in the output signal by subtracting a voice element with the noise element. "β" is a small positive value to suppress a negative value of calculation result. For example, (α, β) is (1.0, 0.01).

In the present embodiment, a suppression coefficient "αn" of the noise excess suppression unit 105 is larger than a suppression coefficient "αs" of the noise suppression unit 104. In the noise excess suppression unit 105, average power (noise level) of noise falls in comparison with the noise suppression unit 104 because of using the larger suppression coefficient. Briefly, a noise level of an output of the noise suppression unit 104 is different from a noise level of an output of the noise excess suppression unit 105. The noise level correction signal generation unit 106 compensates for this defect.

In the noise level correction signal generation unit 106, a signal by multiplying a gain with the input signal $|X(f)|^b$ is generated as follows.

$$|M(f)|^b=(1-\alpha s)|X(f)|^b \quad (8)$$

The adder 107 adds this signal to an output of the noise excess suppression unit 105.

In the switching unit 109, by selecting an output of the noise suppression unit 104 and an output of the adder 107, an output signal is generated. Selection is based on a decision result of the voice/noise decision unit 108. In the case of the voice section, the output of the noise suppression unit 104 is selected. In the case of the noise section, the output of the noise excess suppression unit 105 is selected. As a decision method of the voice/noise decision unit 108, various methods can be used. For example, a method for deciding using signal power and a threshold is used.

In the frequency inverse conversion unit 110, an output of the switching unit 109 is converted from a frequency domain to a time domain, and a time signal emphasizing a voice is obtained. In the case of processing by unit of frame, a time continuous signal can be generated by overlap-add. Furthermore, the output of the switching unit 109 itself may be output without conversion to the time domain (not using the frequency inverse conversion unit 110).

Figure 2A:
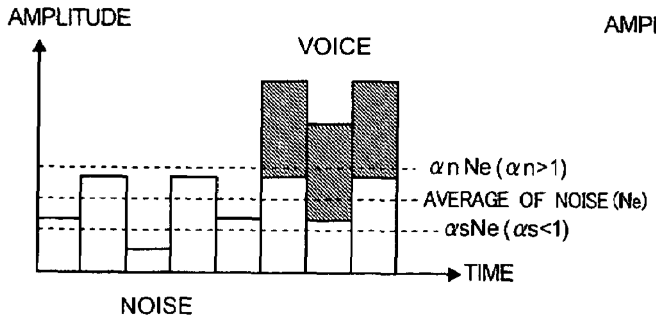
FIGS. 2A-2H are schematic diagrams of input signal amplitude.
Figure 2B:
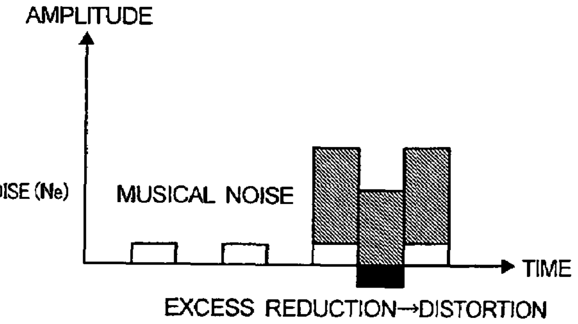

Next, processing of the noise excess suppression unit 105 and the noise level correction signal generation unit 106 is explained in more detail. As mentioned-above, in the spectral subtraction, the musical noise as a phenomenon that a subtraction residue in the noise section sounds unnaturally exists. This phenomenon is explained by referring to FIGS. 2A~2H. FIG. 2A shows an amplitude value ($|X(f)|$) of some frequency f of an input signal of which frequency is converted by each frame (time). In this case, index parts of the equations (3) and (8) are omitted as "b=1" in order to simplify the explanation. In FIG. 2A, a blank box is a noise element of $|X(f)|$ and a an oblique line box is a voice element of $|X(f)|$. In three dotted lines, a center dotted line is a magnitude "$|Ne(f)$" of estimation noise ($\alpha$=1) output from the noise estimation unit 103, an upper dotted line is "$\alpha n|Ne(f)|$", and a lower dotted line is "$\alpha s|Ne(f)|$". First, in the case of noise suppression by $\alpha$=1, the amplitude is reduced as $|Ne(f)|$ as shown in FIG. 2B. This represents usual spectral subtraction, and a voice is emphasized while a noise in the noise section is reduced. However, subtraction residue element intermittently exists in the noise section, and it is heard as a musical noise. Furthermore, in the voice section, a part of voice element is lost because of oversubtraction. This is heard as voice distortion.

Figure 2C:
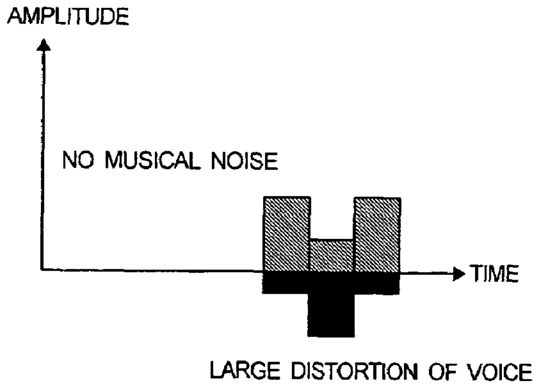
Figure 2D:
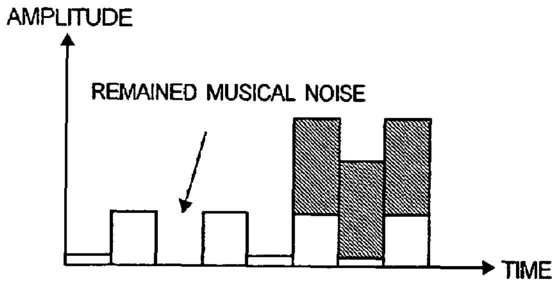
Figure 2E:
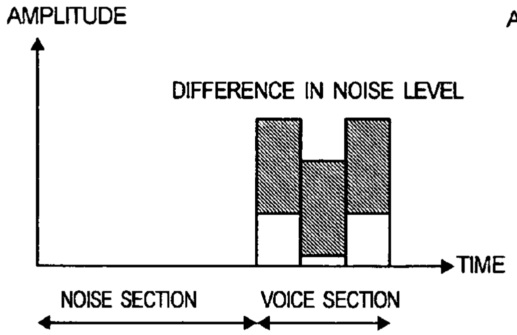

FIG. 2C shows the case of excess suppression by $\alpha n|Ne(f)|$. In the noise section, noise elements are completely suppressed, and the musical noise does not occur. However, in the voice section, voice elements are largely cut, and a large distortion occurs. FIG. 2D shows the case of suppression by $\alpha s|Ne(f)|$. In the voice section, a distortion does not occur. However, in the noise section, bad phenomenon (musical noise) which noise signals are intermittently remained still exists. In the present invention, as shown in FIG. 2E, a voice section and a noise section are previously distinguished. In the voice section, noise signals are suppressed by the method of FIG. 2D to avoid a distortion. In the noise section, noise signals are over-suppressed by the method of FIG. 2C to completely eliminate the musical noise.

Figure 2F:
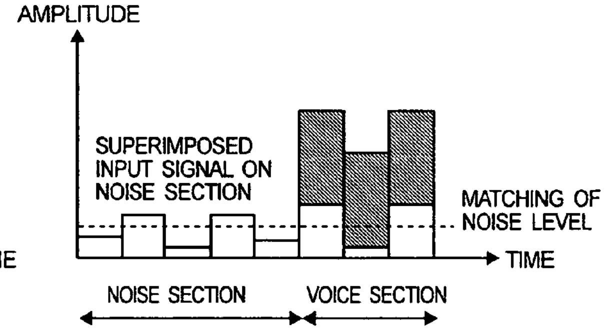

As shown in FIG. 2E, in the noise section, noise signals are completely eliminated. However, in the voice section, noise signals remain instead of non-occurrence of distortion. As a result, this remained noise is perceived by a person and noise level is discontinuously heard between the noise section and the voice section. In order to solve this problem, as shown in FIG. 2F, a signal as the input signal of which level is reduced is added in the noise section so that a noise level of the noise section is matched with a noise level of the voice section. In this explanation, however, imprecise expressions must be taken into consideration. For example, the amplitude of an addition signal of the noise and the voice is not always a sum of each amplitude.

In the present invention, the musical noise is eliminated by excess suppression, and addition of input signal is executed to correct a difference of noise level between the voice section and the noise section. This is different from the prior method for adding the input signal to all sections in order not to perceive the musical noise. Accordingly, in the present invention, by setting a large suppression coefficient in the voice section, a level of signal to be added to the noise section can be lowered. Briefly, reduction effect of the musical noise can not badly affect by this operation.

On the other hand, in the prior art, a level of signal to be added is closely connected with perceptible degree of the musical noise. The smaller the signals to be added are, the higher the perceptible degree is. In the equation (8), a gain ($1-\alpha s$) of the input signal is calculated as follows.

First, by setting the suppression coefficient $\alpha s$ as a small value in order not to occur a distortion in the voice section, a value of $\alpha s$ is smaller than "1". If the voice section includes noise signal only, a noise element of ($1-\alpha s$) remains with subtraction operation. On the other hand, in the noise section, noise does not remain because of excess suppression. Accordingly, by adding the noise element of ($1-\alpha s$) to the noise section, a noise level of the noise section is matched with a noise level of the voice section.

If the suppression coefficient $\alpha s$ of the voice section is near "1", a gain ($1-\alpha s$) of noise to be added becomes a small value. In this case, addition of the input signal may be omitted because a difference of noise level between the voice section and the noise section is hard to perceive. Furthermore, in the case of noise of large variance, a difference of noise level can not be always compensated by a method of the present embodiment. In this case, a compensation method taking variance into account can be used.

Figure 2G:
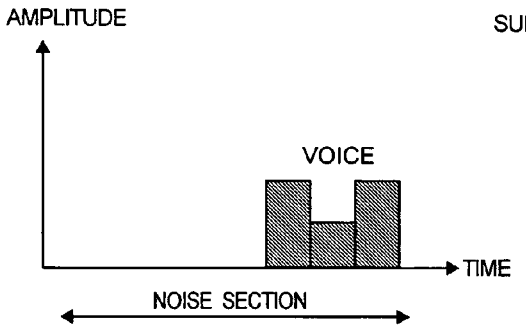
Figure 2H:
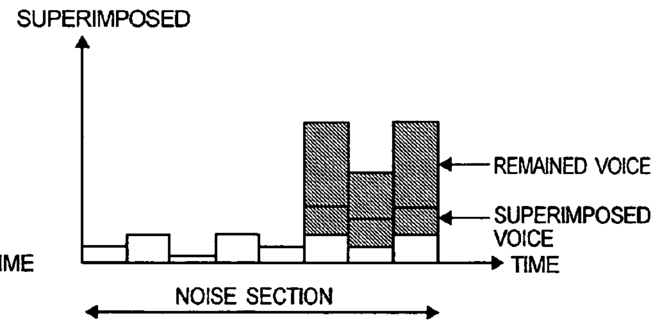

FIG. 2G shows a status after noise excess suppression in the case of deciding that all sections are erroneously a noise section. As mentioned-above, by noise excess suppression, the musical noise does not occur in the noise section. However, a large distortion occurs in the voice section. In the present invention, by adding the input signal (correction signal) to the noise section after noise excess suppression, a voice element with a noise element is added to the voice section which was erroneously decided as the noise section. As a result, the distortion that occurred once in the voice section can be eliminated as shown in FIG. 2H. Briefly, even if the voice section is erroneously decided as the noise section, the voice signal is not erroneously suppressed. In other words, this method is robust for error of voice/noise decision result.

Figure 3:
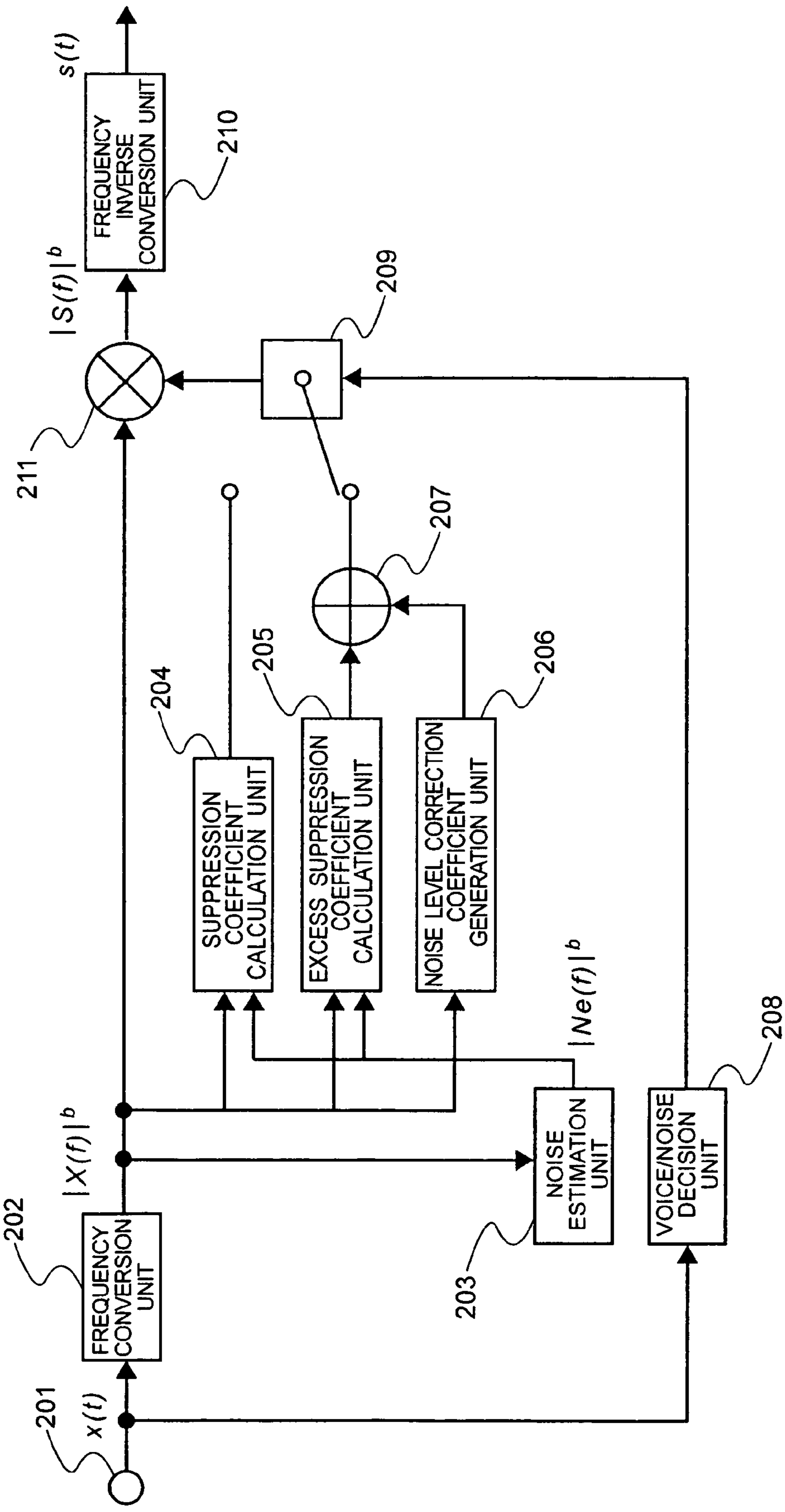
FIG. 3 is a block diagram of a noise suppression apparatus according to a second embodiment of the present invention.

FIG. 3 is a block diagram of the noise suppression apparatus according to the second embodiment of the present invention. In the noise suppression apparatus of the second embodiment, a component in which the spectral subtraction of the first embodiment is applied to a form of multiplication with a transfer function is shown. While the first embodiment represents a suppression method of subtraction shown in equation (3), the second embodiment represents a suppression method of multiplication shown in equation (4). These are substantially the same. Accordingly, in the following embodiments, the suppression method of subtraction shown in equation (3) can be also realized. As a difference between the first embodiment and the second embodiment, the noise suppression unit 104, the noise excess suppression unit 105, and the noise level correction signal generation unit 106 are respectively replaced by a suppression coefficient calculation unit 204, an excess suppression coefficient calculation unit 205, and a noise level correction coefficient generation unit 206. Furthermore, a multiplication unit 211 to multiply the input signal with a weight coefficient as output of the switching unit 209 is added.

The suppression coefficient calculation unit 204 calculates a suppression coefficient as follows.

$$ws(f) = \text{Max}\left(\frac{(|X(f)|^b - \alpha s|Ne(f)|^b)}{|X(f)|^b}, \beta\right)^{\left(\frac{1}{a}\right)} \tag{9}$$

The excess suppression coefficient calculation unit 205 calculates a suppression coefficient as follows.

$$wn(f) = \text{Max}\left(\frac{(|X(f)|^b - \alpha n|Ne(f)|^b)}{|X(f)|^b}, \beta\right)^{\left(\frac{1}{a}\right)} \tag{10}$$

As mentioned-above, in the case of "(a, b)=(1, 1)", the noise suppression is the same as a spectral subtraction using am amplitude spectral. In the case of "(a, b)=(2, 2)", the noise suppression is the same as a spectral subtraction using a power spectral. In the case of "(a, b)=(1, 2)", the noise suppression is the same as a form of Winner filter. In the suppression coefficient calculation unit 204, the suppression coefficient is "αs", and set as suppression not to distort a voice in the voice section. In the excess suppression coefficient calculation unit 205, the suppression coefficient is "αn", and set as a large coefficient to sufficiently eliminate the musical noise in the noise section. This feature is the same as the first embodiment.

In the noise level correction coefficient generation unit 206, a weight coefficient corresponding to the equation (8) is calculated as follows.

$$wo(f)=(1-\alpha s) \tag{11}$$

In an adder 207, following calculation is executed.

$$wno(f)=wn(f)+wo(f) \tag{12}$$

Based on a result of the voice/noise decision unit 208, the switching unit 209 selects ws(f) or wno(f), and outputs the last weight coefficient ww(f). In the multiplier 211, this weight coefficient ww(f) is multiplied with a spectral X(f) of the input signal, and an output signal S(f) is calculated as follows.

$$S(f)=ww(f)X(f) \tag{13}$$

In the second embodiment, expression of the first embodiment is only replaced by a multiplication form of a transfer function. However, by smoothing of |X(f)|, a local variation of weight coefficient calculated by equations (9) and (10) is suppressed, and change of the weight coefficient can be smoothed. As a result, voice quality improves.

On the other hand, X(f) of equation (13) becomes unclear by smoothing. Accordingly, smoothing should not be executed. As a smoothing method of X(f) of equations (9) and (10), for example, a method of equation (6) can be used. The smoothing method of the second embodiment can be executed in the first embodiment. However, in the second embodiment, the smoothing can be more simply executed.

In the same way as in the first embodiment, in the case that the suppression coefficient "αs" of the voice section is near "1", a gain (1−αs) of noise to be added is a small value. In this case, the noise need not be added because a difference of noise level between the voice section and the noise section is hard to perceive. Furthermore, in the case of noise of large variance, the difference of noise level can not be completely compensated irrespective of using this method. In this case, a compensation method taking variance into account can be used.

Figure 4:
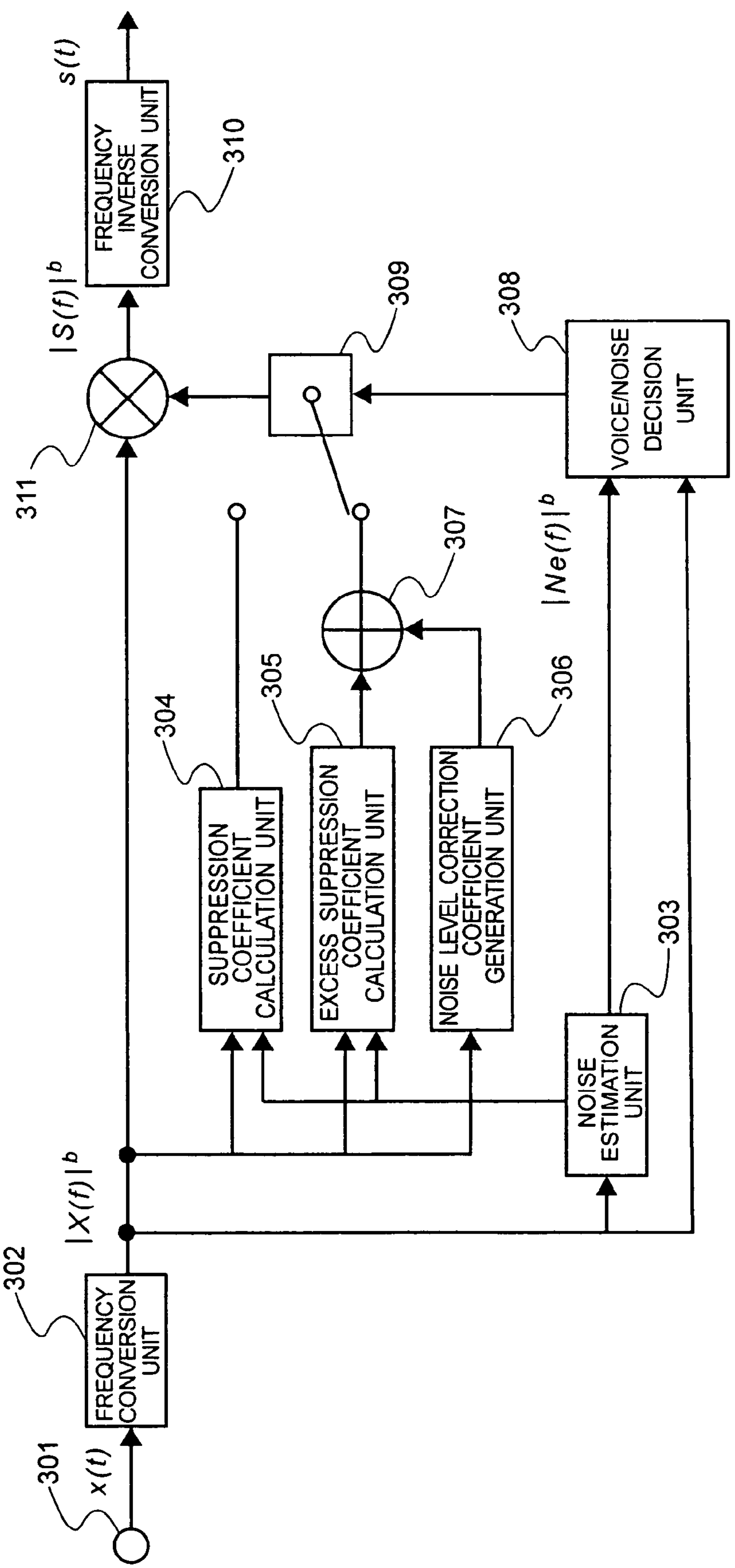
FIG. 4 is a block diagram of a noise suppression apparatus according to a third embodiment of the present invention.

FIG. 4 is a block diagram of the noise suppression apparatus according to the third embodiment of the present invention. In the second embodiment, the voice/noise decision unit 208 decides based on the input signal x(t). However, in the third embodiment, a voice/noise decision unit 308 decides an estimation noise |Ne(f)| and an input signal (frequency) |X(f)|. A ratio "SNR" of the estimation noise |Ne(f)| to the input signal is calculated as follows.

$$SNR = \frac{\sum_{f=0}^{M-1} |X(f)|^2}{\sum_{f=0}^{M-1} |N(f)|^2} \tag{14}$$

In the third embodiment, this ratio is used to select the weight coefficient. "SNR" may be calculated not in all bands, but only in a band concentrating voice power.

Figure 5:
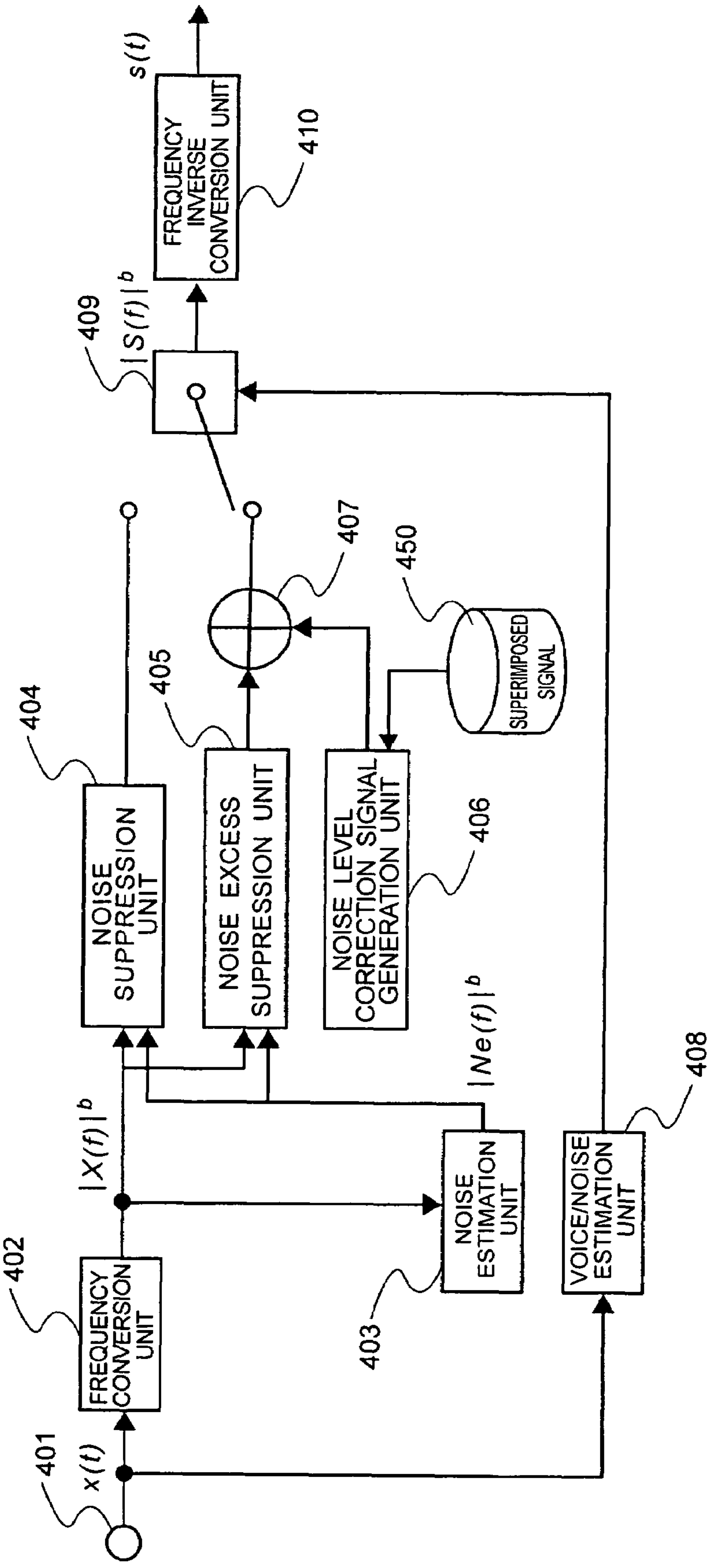
FIG. 5 is a block diagram of a noise suppression apparatus according to a fourth embodiment of the present invention.

FIG. 5 is a block diagram of the noise suppression apparatus according to the fourth embodiment of the present invention. In the first embodiment, the noise level correction signal generation unit 106 generates a correction signal from the input signal. However, in the fourth embodiment, a noise level correction signal generation unit 406 generates a correction signal from a superimposed signal 450 previously stored. In the case that the noise section is set as a white noise or a comfort noise, this embodiment is effective.

Figure 6:
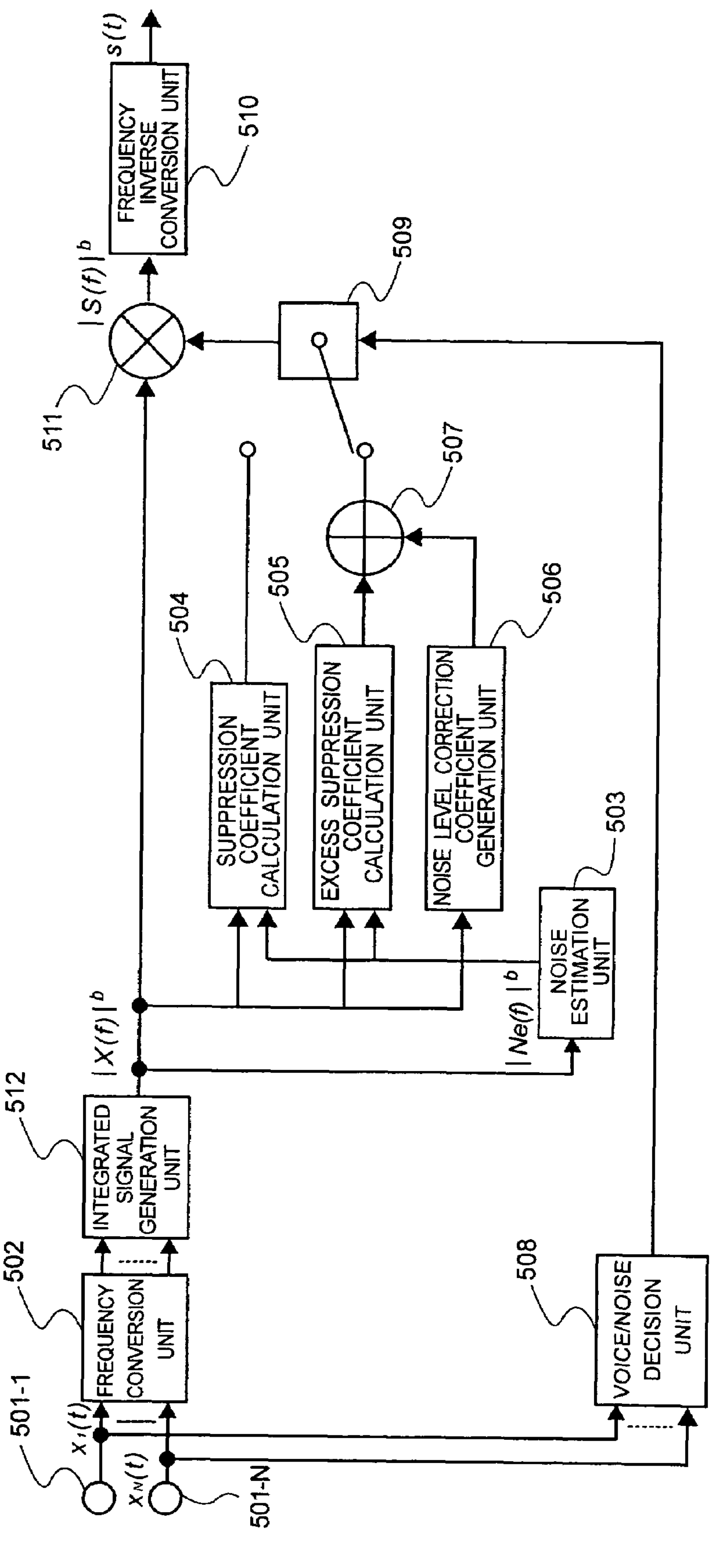
FIG. 6 is a block diagram of a noise suppression apparatus according to a fifth embodiment of the present invention.

FIG. 6 is a block diagram of the noise suppression apparatus according to the fifth embodiment of the present invention. In the fifth embodiment compared with the second embodiment, input terminals 501-1~501-N of N units, a frequency conversion unit 502 to convert the input signals of the terminals 501-1~501-N to a frequency domain, an integrated signal generation unit 512 to output one signal by integrating each output signal of the frequency conversion unit 502, and a voice/noise decision unit 508 to decide a voice/noise from input signals of terminals 501-1~501-N are added.

Figure 7:
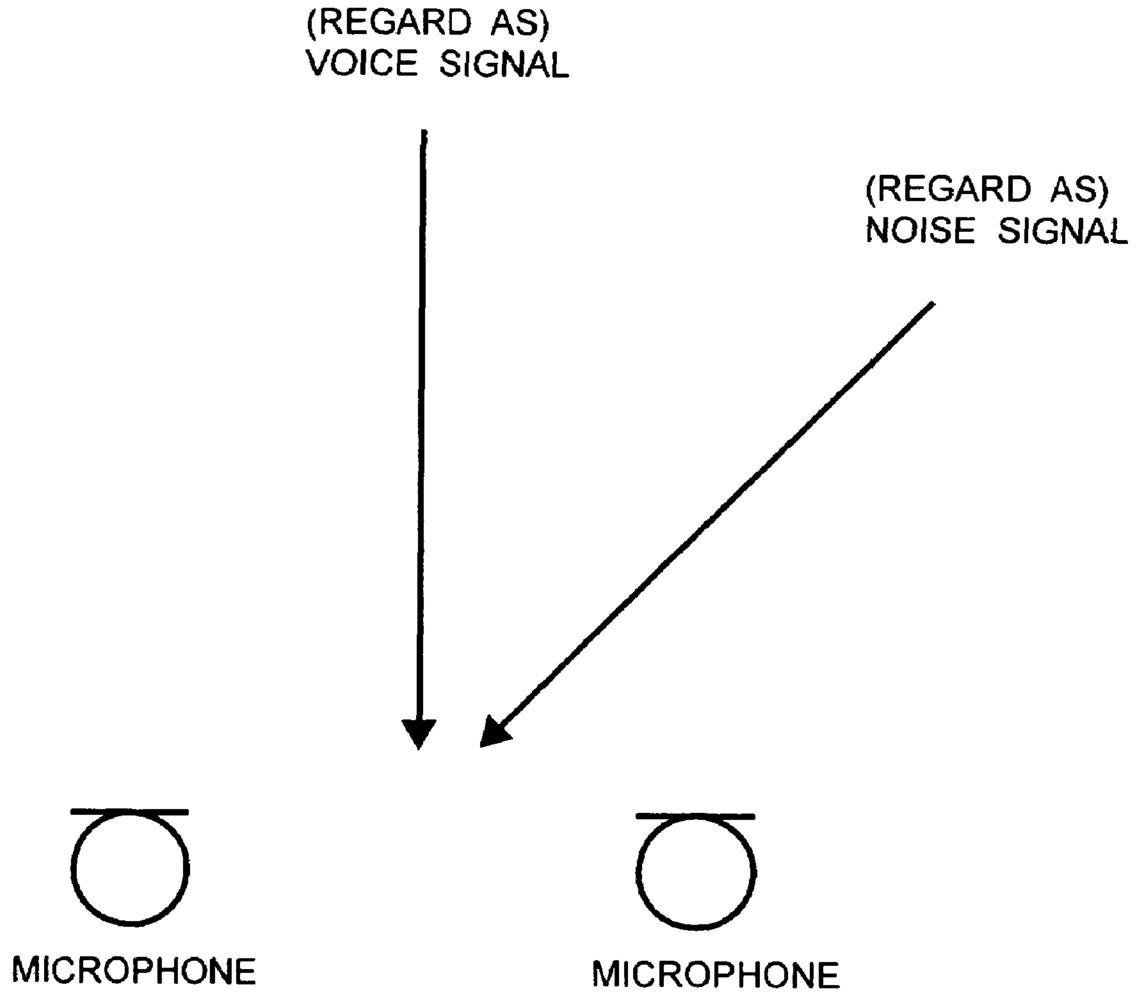
FIG. 7 is a schematic diagram of a microphone array function.

A method for emphasizing a sound of predetermined direction by a plurality of microphones such as a microphone array can be utilized. In this method, a problem whether the input signal is a voice or noise can be replaced as a problem whether the signal is received from a predetermined direction. In the voice/noise decision unit 508, each of a plurality of input signals is decided to be a voice or a noise based on a receiving direction of the signal. For example, as shown in FIG. 7, in the case that a signal received from a front direction is regarded as a voice signal using two microphones, assume that receiving signals are $X_0(f)$ and $X_1(f)$. In this case, a voice section can be detected by following value Ph as an index.

$$Ph = (1/M)\sum_{f=0}^{M-1} |\arg(X_0(f)X_1^*(f))| \quad (15)$$

In the equation (15), "$X_1^*(f)$" is a conjugate complex number of $X_1(f)$, "arg" is an operator to extract a phase, and "M" is a number of elements of frequency. Signals from the front direction are received as the same phase by two microphones. By multiplying a signal of one microphone with a conjugate complex number of a signal of the other microphone, a phase item becomes zero. Accordingly, as for a signal ideally received from the front direction, a minimum "Ph" of the equation (15) is "0". As for a signal received from another direction, the more that direction shifts from the front direction, the larger the value Ph is. Accordingly, by setting a suitable threshold, voice/noise can be decided. In the case of a plurality of microphones equal to or more than two, for example, a value "Ph" of the equation (15) is calculated for each two combinations of all microphones.

In the integrated signal generation unit 512, one signal is generated from a plurality of input signals. For example, in a method called "delay and sum array", the plurality of input signals are added. Concretely, the integrated signal "X(f)" is represented using input signals $X_1(f)$~$X_N(f)$ as follows.

$$X(f) = 1/N\sum_{i=0}^{N-1} X_i(f) \quad (16)$$

In the equation (16), "N" represents a number of microphones.

In this method, target signals input from the front direction are emphasized because of the same phase, and signals input from another direction are weakened because of a shift of the phases. As a result, a target signal is emphasized while a noise signal is suppressed. Accordingly, by a multiplier effect with a noise suppression effect of spectral subtraction (post stage), high noise suppression ability can be realized in comparison with using one microphone.

Furthermore, by detecting a voice section using a plurality of microphones, high detection ability can be realized in comparison with using one microphone. For example, in the case of receiving a disturbance sound from a side direction, this sound is hard to distinguish from a voice by one microphone. However, by a plurality of microphones, this sound can be distinguished from a voice signal (received from the front direction) using a phase element as shown in the equation (15).

In FIG. 6, the integrated signal generation unit 512 is located after the frequency conversion unit 502. However, the integrated signal generation unit 512 may be located before the frequency conversion unit 502.

Figure 8:
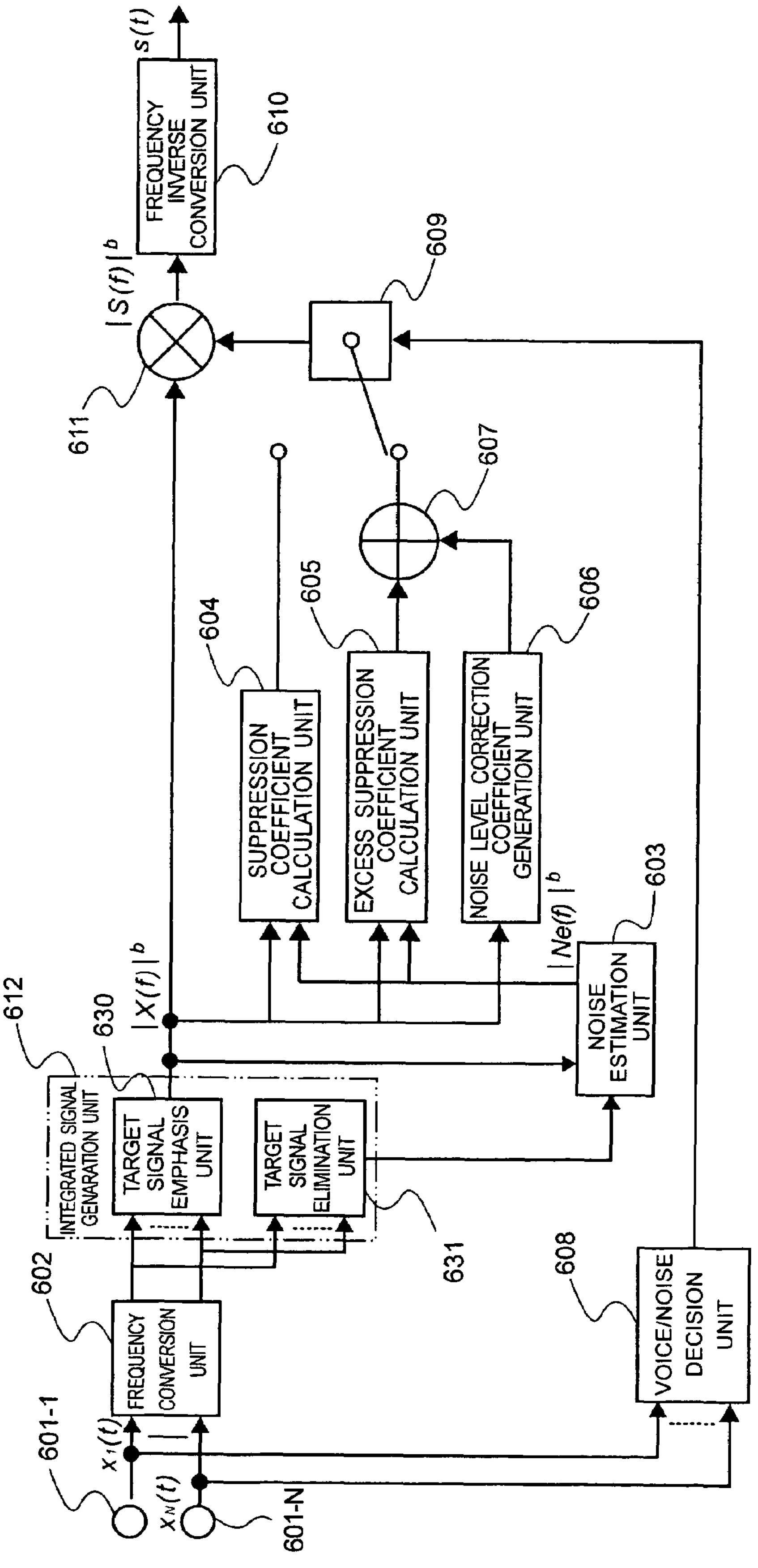
FIG. 8 is a block diagram of a noise suppression apparatus according to a sixth embodiment of the present invention.

FIG. 8 is a block diagram of the noise suppression apparatus according to the sixth embodiment of the present invention. In the sixth embodiment, the integrated signal generation unit 612 of the fifth embodiment is composed by a target signal emphasis unit 630 and a target signal elimination unit 631. In the same way as the fifth embodiment, the target signal emphasis unit 630 emphasizes a signal received from a predetermined direction (For example, the front direction) of a target sound. The target signal elimination unit 631 sets a direction (For example, the side direction) different from the predetermined direction of the target signal emphasis unit 630 as a target signal direction. As a result, in the target signal elimination unit 631, a voice signal received from the front direction is weakened while a surrounding noise is emphasized. In this way, a unit forming directivity along a predetermined direction is called "a beam former". The delay and sum array in the fifth embodiment is one of the beam former.

In the sixth embodiment, the target signal emphasis unit 630 and the target signal elimination unit 631 are realized by a beam former of Griffith-Jim form as a representation of the adaptive array. This component is now explained.

Figure 9:
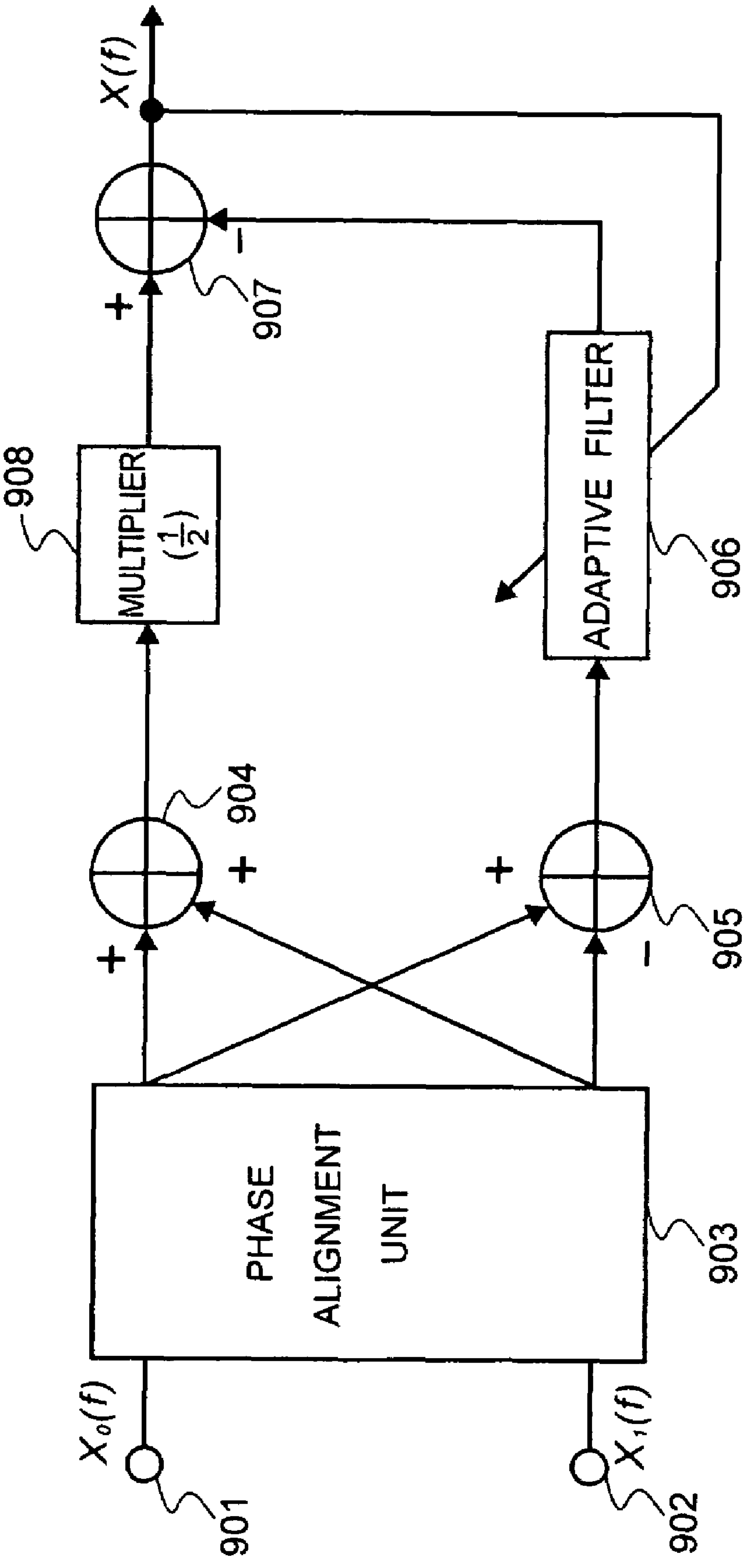
FIG. 9 is a block diagram of a Griffith-Jim type beam former.

FIG. 9 is a block diagram of the beam former of Griffith-Jim form. An output X(f) of the beam former is calculated using input signals $X_0(f)$ and $X_1(f)$, and an adaptive filter. First, $X_0(f)$ and $X_1(f)$ are respectively input to input terminals 901 and 902. In a phase alignment unit 903, a phase is adjusted so that phases of each signal from the target sound direction are the same. Two outputs from the phase alignment unit 903 are added by an adder 904, and subtracted by a subtractor 905. An output from the adder 904 is divided into two by a multiplier 908. By the subtractor 905, a target sound is eliminated from the two outputs of the phase alignment unit 903. Remained signal from the subtractor 905 is input to the adaptive filter 906. A subtractor 907 subtracts an output of the adaptive filter 906 from an output of the multiplier 908. As a result, the subtractor 907 outputs a signal X(f) from which the noise is eliminated.

In the beam former of Griffith-Jim form, a trough notch which a sensitivity immediately falls along a disturbance sound direction can be formed. This characteristic is suitable for the target signal elimination unit 631 to eliminate a voice from the front direction as a disturbance sound.

Furthermore, an output signal of the target signal elimination unit 631 is used as an input signal of a noise estimation unit 603. The noise estimation unit 606 finds a non-voice section by observing X(f) and generates an estimation noise by smoothing the non-voice section. On the other hand, the output of the target signal elimination unit 631 is always noise, and used for elimination of the noise. Accordingly, by using these two signals, noise estimation of high accuracy can be executed.

Figure 10:
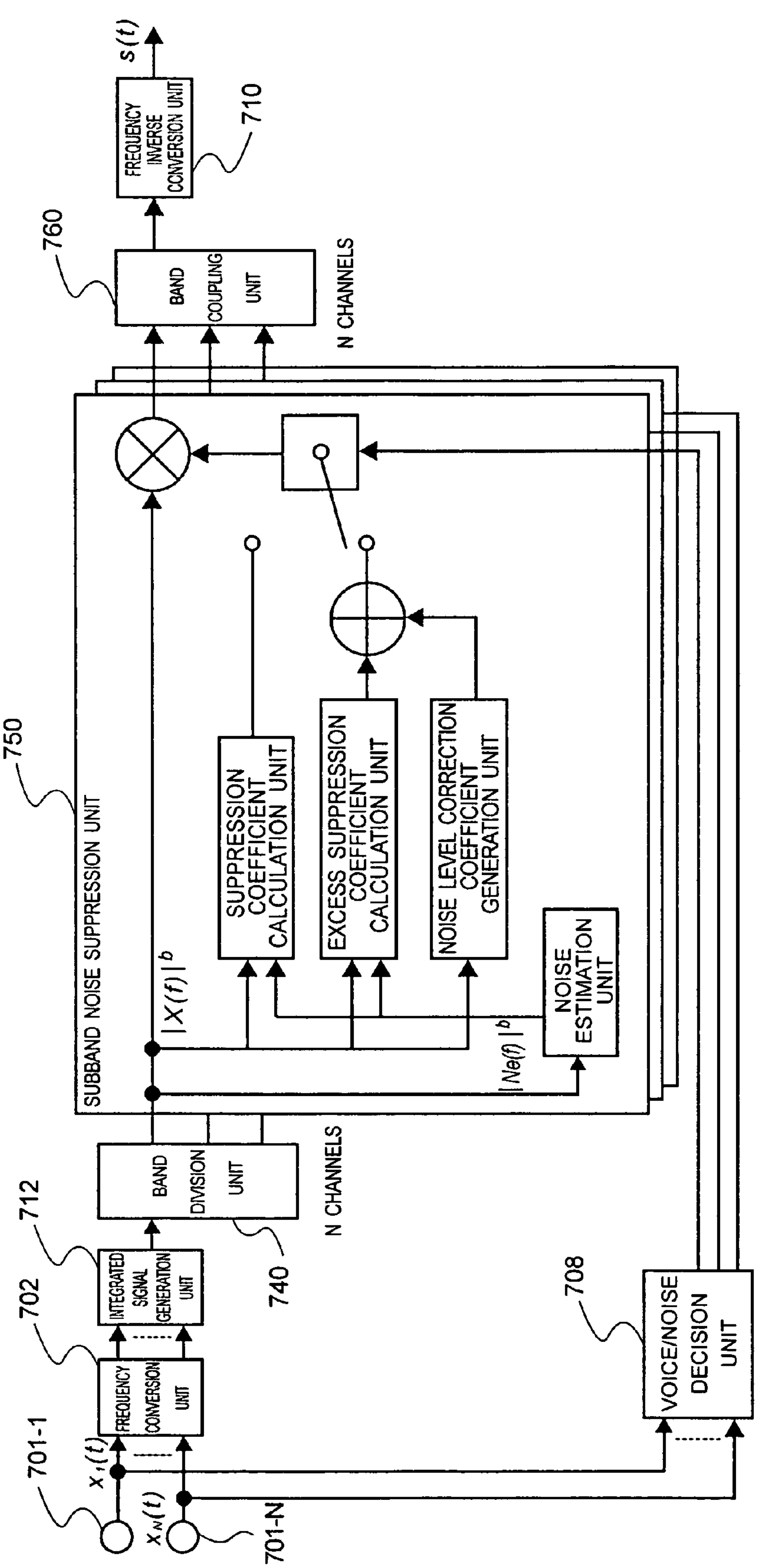
FIG. 10 is a block diagram of a noise suppression apparatus according to a seventh embodiment of the present invention.

FIG. 10 is a block diagram of the noise suppression apparatus according to the seventh embodiment of the present invention. In the seventh embodiment, an output X(f) of the integrated signal generation unit 512 of the fifth embodiment is divided into subband by a band division unit 740, and noise suppression is executed for each subband. The noise suppression method is the same as in the above-mentioned embodiments. A voice/noise decision unit 708 executes decision for each subband.

A spectral of voice along a frequency direction includes a section with amplitude and a section without amplitude. Briefly, the spectral of voice includes a peak and a trough. A frequency of the trough is regarded as a noise section, and processing for the noise section such as the estimation of noise level or the excess suppression can be used. By dividing the frequency into subbands, a plurality of subband noise suppression units 750 respectively executes noise suppression of each subband. Briefly, based on a decision of voice/noise of each subband by the voice/noise decision unit 708, each subband noise suppression unit 750 switches the noise suppression method between the voice section and the noise section. As a result, quality of the voice section improves.

In the seventh embodiment, after generating an integrated signal from a plurality of input signals, the integrated signal is divided into subbands. However, after dividing the plurality of input signals into subbands, an integrated signal of each subband may be generated.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through a network. Furthermore, in the present invention, the computer is not limited to a personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A noise suppression apparatus, comprising:

a noise estimation unit configured to estimate a noise signal in an input signal;

a section decision unit configured to decide a target signal section and a noise signal section in the input signal;

a noise suppression unit configured to suppress the noise signal based on a first suppression coefficient from the input signal;

a noise excess suppression unit configured to suppress the noise signal based on a second suppression coefficient from the input signal, the second suppression coefficient being larger than the first suppression coefficient;

a correction signal generation unit configured to generate a correction signal by multiplying the input signal by a correction coefficient to match with a level of the noise signal remaining in the output signal from said noise suppression unit;

an adder configured to add the correction signal with the output signal from said noise excess suppression unit; and a switching unit configured to switch between an output signal from said noise suppression unit and an output signal from said adder based on a decision result of said section decision unit.

2. The noise suppression apparatus according to claim 1, wherein the input signal includes a voice signal as a target signal.

3. The noise suppression apparatus according to claim 1, wherein said noise suppression unit multiplies the noise signal by the first suppression coefficient, and subtracts a multiplication signal from the input signal, and wherein said noise excess suppression unit multiplies the noise signal by the second suppression coefficient, and subtracts a multiplication signal from the input signal.

4. The noise suppression apparatus according to claim 1, wherein said switching unit selects the output signal from said noise suppression unit if the decision result is the target signal section, and wherein said switching unit selects the output signal from said adder if the decision result is the noise signal section.

5. The noise suppression apparatus according to claim 1, further comprising:

a correction signal generation unit configured to generate a correction signal by multiplying the input signal by a correction coefficient to match with a level of the noise signal remaining in the output signal from said noise suppression unit, and an adder configured to add the correction signal with the output signal from said noise excess suppression unit.

6. The noise suppression apparatus according to claim 5, wherein said switching unit selects an output signal from said adder if the decision result is the noise signal section.

7. The noise suppression apparatus according to claim 1, wherein said noise suppression unit calculates the first suppression coefficient from the input signal and the noise signal, wherein said noise excess suppression unit calculates the second suppression coefficient from the input signal and the noise signal, and wherein said switching unit switches between the first suppression coefficient and the second suppression coefficient based on the decision result.

8. The noise suppression apparatus according to claim 7, further comprising:

a multiplier configured to multiply the input signal by the suppression coefficient selected by said switching unit.

9. The noise suppression apparatus according to claim 8, wherein said correction signal generation unit calculates the correction coefficient from the input signal, and wherein said adder adds the correction coefficient to the second suppression coefficient.

10. The noise suppression apparatus according to claim 9, wherein said switching unit selects an output signal from said adder if the decision result is the noise signal section.

11. The noise suppression apparatus according to claim 1, wherein said section decision unit decides the target signal section and the noise signal section from the input signal and the noise signal.

12. The noise suppression apparatus according to claim 1, wherein said correction signal generation unit generates the correction signal using a superimposed signal previously stored.

13. The noise suppression apparatus according to claim 1, further comprising:

an integrated signal generation unit configured to generate an integrated signal by emphasizing the target signal from a plurality of input signals.

14. The noise suppression apparatus according to claim 13, wherein said noise estimation unit estimates the noise signal from the integrated signal, wherein said section decision unit decides the target signal section and the noise signal section from the plurality of input signals, wherein said noise suppression unit suppresses the noise signal based on the first suppression coefficient from the integrated signal, and wherein said noise excess suppression unit suppresses the noise signal based on the second suppression coefficient from the integrated signal.

15. The noise suppression apparatus according to claim 14, further comprising:

a target signal elimination unit configured to generate a target voice elimination signal by suppressing the target signal from the plurality of input signals.

16. The noise suppression apparatus according to claim 15, wherein said noise estimation unit estimates the noise signal from the integrated signal and the target voice elimination signal.

17. The noise suppression apparatus according to claim 13, wherein said noise estimation unit, said noise suppression unit, said noise excess suppression unit, and said switching unit, comprise a subband noise suppression unit, the noise suppression apparatus further comprising a subband noise suppression unit for each subband, and wherein said section decision unit decides the target signal section and the noise signal section of each subband from the plurality of input signals.

18. The noise suppression apparatus according to claim 17, further comprising:

a band division unit configured to divide the integrated signal into subbands, and to correspondingly provide the divided integrated signal of each subband to one of the plurality of subband noise suppression units, and a band coupling unit configured to couple each output signal from the plurality of subband noise suppression units.

19. A noise suppression method, comprising:

estimating a noise signal in an input signal;

deciding a target signal section and a noise signal section in the input signal;

suppressing the noise signal based on a first suppression coefficient from the input signal to obtain a first output signal;

suppressing the noise signal based on a second suppression coefficient from the input signal to obtain a second output signal, the second suppression coefficient being larger than the first suppression coefficient;

generating a correction signal by multiplying the input signal by a correction coefficient to match with a level of the noise signal remained in the first output signal;

adding the correction signal with the second output signal to obtain a third output signal; and switching between the first output signal and the third output signal based on a decision result.

20. A computer readable memory device storing program instructions which when executed by a computer results in performance of steps causing the computer to suppress a noise, the steps comprising:

estimating a noise signal in an input signal;

deciding a target signal section and a noise signal section in the input signal;

suppressing the noise signal based on a first suppression coefficient from the input signal to obtain a first output signal;

suppressing the noise signal based on a second suppression coefficient from the input signal to obtain a second output signal, the second suppression coefficient being larger than the first suppression coefficient;

generating a correction signal by multiplying the input signal by a correction coefficient to match with a level of the noise signal remained in the first output signal;

adding the correction signal with the second output signal to obtain a third output signal; and switching between the first output signal and the third output signal based on a decision result.

* * * * *